3,232,954
SULFOLANYL PHENYLHYDRAZINES AND THEIR PREPARATION

Christopher Stanley Argyle and Ronald Arthur Reed, Loughborough, England, assignors to Whiffen & Sons Limited, Loughborough, England, a British company
No Drawing. Filed Jan. 12, 1962, Ser. No. 165,934
5 Claims. (Cl. 260—332.1)

The present invention relates to a new chemical compound which possesses fungicidal activity.

It has been found that sulpholanyl phenylhydrazine is an active fungicide which is particularly useful against certain rusts, showing not only protectant but also systemic and eradicant activity, and which is non-phytotoxic.

Accordingly the present invention is for sulpholanyl phenylhydrazine and salts and functional derivatives thereof. Sulpholanyl phenylhydrazine is of the following formula:

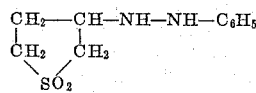

The systematic name for this compound is N-phenyl-N'-3-sulpholanyl hydrazine, but for convenience this is referred to herein as sulpholanyl phenylhydrazine. Salts of sulpholanyl phenylhydrazine according to the present invention which may be mentioned include strong acid addition salts such as the hydrochloride or sulphate. Functional derivatives which may be mentioned include acyl derivatives of the hydrazine function, for example acetyl, propionyl or benzoyl derivatives, such as for example N'-phenyl-N-3-sulpholanyl-N-acetohydrazide and N-phenyl-N'-3-sulpholanyl-N-acetohydrazide.

The present invention is also for a fungicidal composition which contains as an active ingredient sulpholanyl phenylhydrazine or a salt or functional derivative thereof. The fungicidal composition may also contain one or more of the materials selected from the group comprising surface active agents and solid diluents.

The present invention is also for a process for the treatment of plants, areas or materials which comprises treating the plants, areas or materials with a fungicidal composition containing as an active ingredient sulpholanyl phenylhydrazine, or a salt or functional derivative thereof.

According to one embodiment of the present invention there is provided a process for preparing sulpholanyl phenylhydrazine as identified above, which comprises warming phenylhydrazine with alpha- or beta-sulpholene, with or without a small quantity of a strong base, such as for example an alkali metal hydroxide.

The temperature at which the above process is carried out depends on the reactants involved. In general, if the time of reaction is to be minimised, temperatures above 50° C. but below the decomposition temperature of the sulpholene are employed.

Alpha-sulpholene and beta-sulpholene are capable of isomerization under certain conditions. Thus for example beta-sulpholene isomerizes to alpha-sulpholene in the presence of a strong base, for example hydrazine, potassium hydroxide, sodium hydroxide and the like.

Furthermore it is believed that beta-sulpholene is less reactive than alpha-sulpholene and that reactions with beta-sulpholene may involve isomerization to alpha-sulpholene.

Thus alpha-sulpholene will react quickly with phenylhydrazine in the absence of a strong base whereas beta-sulpholene reacts rather slowly with phenylhydrazine in the absence of additional strong bases. This reaction proceeds more quickly in the presence of a strong base.

In carrying out the above process an excess of the phenylhydrazine is preferably employed. The excess of the phenylhydrazine can be removed on completion of the reaction by distillation or by water washing or by any other suitable means.

The product of the present process is preferably recovered as the hydrochloride or a similar salt.

A further embodiment of the present invention is for a method for preparing sulpholanyl phenylhydrazine which comprises reacting together 3-halogeno-sulpholane and phenylhydrazine.

A yet further embodiment of the invention is for a process for preparing sulpholanyl phenylhydrazine which comprises reducing 3 - ketosulpholane phenylhydrazone which is preferably effective with lithium aluminum hydride.

Sulpholanyl phenylhydrazine according to the present invention is active against a wide range of fungal organisms including *Uromyces phaseoli* and *Erysiphe cichoracearum*.

Sulpholanyl phenylhydrazine is not very soluble in water and may be incorporated in fungicidal compositions in any of the ways commonly adopted for the formulation of insoluble fungicides. Thus for example sulpholanyl phenylhydrazine may be incorporated into an aqueous suspension with or without wetting agents or into an emulsion and/or mixed with solid inert diluents.

Many salts and other functional derivatives of sulpholanyl phenylhydrazine according to the present invention are water soluble, and a suitable fungicidal composition comprises a solution of the water soluble sulpholanyl phenylhydrazine or salt or derivative thereof in water.

Alternatively the fungicidal composition may be formed by dissolving sulpholanyl phenylhydrazine or a salt or functional derivative in a water immiscible solvent such as for example a high boiling aromatic hydrocarbon containing dissolved emulsifying agents so as to act as a self-emulsifiable oil on addition to water.

Similarly the fungicidal composition may be formed by dissolving the sulpholanyl phenylhydrazine or a salt or functional derivative in an organic solvent, such as for example methyl Cellosolve or ethanol, and the resulting solution used as such or dispersed in water with or without the assistance of a wetting agent. Alternatively the sulpholanyl phenylhydrazine or a salt or functional derivative may be admixed with a wetting agent or a non-solvent diluent to be used as such or to form a product which is dispersible in water. The sulpholanyl phenylhydrazine or a salt or functional derivative may also be mixed with a wetting agent, with or without the incorporation of powdered or divided solid materials as referred to below, so that a wettable product is obtained which is capable of use as such or as a suspension or dispersion in water.

The sulpholanyl phenylhydrazine or a salt or functional derivative may be incorporated for example with solid inert media comprising powdered or divided solid materials, for example clays, sands, talc, mica, fertilizers and the like, such products either comprising dust or larger particle size materials.

The sulpholanyl phenylhydrazine or a salt or functional derivative may be incorporated for example with solid inert media comprising powdered or divided solid materials, as referred to above, together with a wetting agent, so that a wettable product is obtained which is capable of use as such or as a suspension or dispersion in water.

The wetting agents used may comprise anionic compounds such as for example soaps, fatty sulphate esters such as dodecyl sodium sulphate, fatty aromatic sulphonates such as alkylbenzene-sulphonates or butyl naphthalene sulphates, more complex fatty sulphonates such as the amide condensation product of oleic acid and N-methyl taurine or sodium sulphonate of dioctyl succinic acid. The wetting agent may also comprise non-ionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

If desired the fungicidal compositions according to the present invention may contain in addition to sulpholanyl phenylhydrazine other agricultural chemicals such as herbicides, fungicides, pesticides, plant growth regulants and the like. According to one embodiment of the invention sulpholanyl phenylhydrazine or a salt or functional derivative is mixed with other fungicides such as for example sulphur, copper compounds such as cuprous oxide or copper oxychloride, nickel compounds such as nickel hydroxide or organic fungicides such as tetramethyl-thiuram disulphide or salts of ethylene bisdithiocarbamic acid.

The following examples are given to illustrate the present invention. The parts and percentages quoted are by weight unless otherwise indicated.

Example 1

A clear solution of 45 parts phenylhydrazine and 24 parts of alpha-sulpholene in 30 parts water was boiled for three hours. Addition of 25 parts of methanol slowly gave crystalline N-phenyl-N'-3-sulpholanylhydrazine. Yield 20 parts; melting point 106–108° C.

Found: C, 53.7; H, 5.4; N, 12.7; S, 14.1%. $C_{10}H_{15}O_2N_2S$ requires: C, 53.1; H, 6.2; N, 12.4; S, 14.15%.

Example 2

Passage of hydrogen chloride into a solution of N-phenyl-N'-3-sulpholanylhydrazine in ethanol quantitatively yields the hydrochloride; melting point 186° C. with decomposition.

Found: N, 10.65; S, 12.4; Cl, 13.4%. $C_{10}H_{15}O_2N_2SHCl$ requires: N, 10.65; S, 12.2; Cl, 13.5%.

Example 3

3-chlorosulpholane (melting point 59–60° C.) was treated with 200% excess of phenylhydrazine in boiling aqueous methanol and gave, on cooling, N-phenyl-N'-3-sulpholanylhydrazine, identical with that described in Example 1.

The process was repeated replacing 3-chlorosulpholane by 3-bromo- and 3-iodosulpholane respectively.

Example 4

A mixture of phenylhydrazine (1 mol.) and butadiene sulphone (1 mol.) heated with finely powdered potassium hydroxide (1 mol.) at 60° C. yielded on cooling and dilution with aqueous methanol, N-phenyl-N'-3-sulpholanylhydrazine; melting point 107–108° C.

Example 5

The following components were ground together to give a dry powder composition.

|  | Percent |
|---|---|
| Sulpholanyl phenylhydrazine | 20.0 |
| China clay (54–D) | 55.2 |
| Microsepiolite (powdered meerschaum) | 20 |
| Sulphite lye (Wafex) | 4 |
| Sodium alkylphenolpolyoxyethylene sulphate (Tensiofix WP) | 0.8 |

Example 6

A suspension of 0.5% of the product of the formulation in Example 5 was made up in water comprising a suspension containing 1000 parts per million of sulpholanyl phenylhydrazine. This was sprayed onto the leaves of young French bean plants (*Phaseolus vulgaris* variety pinto) to near run off. After the spray had dried the leaves were dusted with the spores of the rust fungus (*Uromyces phaseoli*). After incubation at 16° C. for 24 hours in the dark the plants were allowed to grow as usual. There was almost complete failure of the fungus to develop on the plants so treated, although abundant pustules of the rust did appear on corresponding untreated control plants.

Example 7

A 1% suspension of the formulation of Example 5 in water comprising a suspension containing 2000 parts per million of sulpholanyl phenylhydrazine was painted on the proximal half of the first true leaves of seedling pinto beans and after drying the whole plants were dusted with spores of *Uromyces phaseoli* and the plants treated as above. Not only did the fungus fail to develop on the treated areas of the leaves, but there was also a complete suppression of its development on the untreated distal half of the leaves.

Example 8

In another experiment cotton wool was wrapped around the petioles of the leaves and soaked in a 1% suspension of the formulation of Example 5. Two days later the plants were dusted with spores and treated as above and there was substantial control of the fungus on the leaves as compared with the development on untreated control plants.

Example 9

In another experiment seedling pinto beans were first dusted with the spores of *Uromyces phaseoli* which were then incubated at 16° C. for 24 hours in the dark and then allowed to grow under normal conditions. Some of the plants were sprayed 5 days after inoculation with a 1% suspension of the formulation according to Example 5, and another set of plants were so treated 10 days after inoculation when pustules of the fungus were just beginning to appear. The first group failed to develop any fungus symptoms and in the second group there was no further development of the immature pustules while there was abundant and normal development of the fungus on untreated control plants.

Example 10

Seedlings of cucumber (*Cucumis sativus*) having two to three expanded true leaves were sprayed with a 1% suspension of the formulation of Example 5 and were subsequently dusted with the spores of *Erysiphe cichoracearum* by shaking the leaves of diseased plants over them. The plants were then placed among other plants on which the disease had already developed and were maintained in an atmosphere of very high humidity for 24 hours and then allowed to grow as usual. Only very little fungus was evident on the plants so treated, whereas all the untreated control plants showed extensive development of the fungus.

Example 11

An aqueous solution of 3-ketosulpholane (melting point 65° C.), phenylhydrazine hydrochloride and sodium acetate was boiled for 30 minutes and gave quantitatively 3-ketosulpholane phenylhydrazine of melting point 169–171° C. This hydrazone, on reduction with aluminium lithium hydride in dry tetrahydrofuran gave N-phenyl-N'-3-sulpholanylhydrazine of melting point 106–107° C. in about 80% yield.

We claim:
1. N-phenyl-N'-3-sulpholanyl hydrazine.
2. An acid addition salt of N-phenyl-N'-3-sulpholanyl hydrazine.

3. N-phenyl-N'-3-sulpholanyl hydrazine hydrochloride.

4. Process for producing N-phenyl-N'-3-sulpholanyl hydrazine which comprises reacting a compound selected from the group consisting of alpha- and beta-sulpholene with an excess of phenylhydrazine in the presence of a strong base.

5. Process for producing N-phenyl-N'-3-sulpholanyl hydrazine which comprises reducing 3-ketosulpholane phenylhydrazone by means of lithium aluminum hydride.

References Cited by the Examiner

UNITED STATES PATENTS

| | | | |
|---|---|---|---|
| 2,393,925 | 1/1946 | Morris et al. | 167—33 |
| 2,430,821 | 11/1947 | Morris et al. | 260—332.1 |
| 2,461,341 | 2/1949 | Morris et al. | 260—332.1 |
| 2,987,437 | 6/1961 | Hessel | 167—33 |
| 3,041,352 | 6/1962 | Newey | 260—332.1 |

OTHER REFERENCES

Backer et al., Rec. Trav. Chim., Vol. 62 (1943), pages 818 and 823.

Evans et al., Nature, Vol. 195 (Aug. 11, 1962), pages 619–20.

Loev, J. Org. Chem., Vol. 26 (1961), pages 4394–4399.

McElvain, The Characterisation of Organic Compounds, The MacMillan Co., New York (1953), pages 74, 76, 90, 91, 118 and 119.

Prochazka, Chemical Abstracts, Vol. 54 (1960), page 12095.

Sidgwick, Organic Chem. of Nitrogen (1937), page 13.

Yale et al., Jour. Amer. Chem. Soc., Vol. 75 (1953), 1933–1936.

WALTER A. MODANCE, *Primary Examiner.*

MORRIS O. WOLK, NICHOLAS S. RIZZO, *Examiners.*